United States Patent [19]

Usui

[11] Patent Number: 5,739,643
[45] Date of Patent: Apr. 14, 1998

[54] DEVICE FOR SUPPLYING ELECTRIC POWER TO FLASHLAMP AND METHOD THEREOF

[75] Inventor: Takeshi Usui, Tokyo, Japan

[73] Assignee: NEC Corporation, Tokyo, Japan

[21] Appl. No.: 534,823

[22] Filed: Sep. 27, 1995

[30] Foreign Application Priority Data

Sep. 30, 1994 [JP] Japan ................................ 6-236535

[51] Int. Cl.⁶ .................................................. H05B 37/02
[52] U.S. Cl. ......................... 315/241 S; 315/200 A; 315/308; 315/224; 315/241 P
[58] Field of Search ........................... 315/209 R, 224, 315/200 A, 308, 241 S, 241

[56] References Cited

U.S. PATENT DOCUMENTS

| | | | |
|---|---|---|---|
| 4,156,166 | 5/1979 | Shapiro et al. | 315/209 R |
| 4,276,497 | 6/1981 | Burbeck et al. | 315/209 |
| 5,103,143 | 4/1992 | Daub | 315/308 |

FOREIGN PATENT DOCUMENTS 0579367  1/1994  European Pat. Off. .

*Primary Examiner*—Robert Pascal
*Assistant Examiner*—Michael Shingleton
*Attorney, Agent, or Firm*—Sughrue, Mion, Zinn, Macpeak & Seas, PLLC

[57] ABSTRACT

An output from a D.C. power source is supplied to a flashlamp through a high speed switching circuit. A current detection circuit detects a current from the high speed switching circuit and a voltage detection circuit detects a voltage applied to the flashlamp. A multiplication circuit multiplies the detected current and voltage to compute a product value. The high speed switching circuit is controlled so that the product value becomes equal to a predetermined value or an amplitude level of a pulse shape control signal inputted from the outside.

23 Claims, 9 Drawing Sheets

SWITCHING CONTROL SIGNAL

SWITCHING ELEMENT CURRENT

CURRENT FLOWING THROUGH FLY-WHEEL DIODE

REACTOR CURRENT

FLASHLAMP CURRENT

MULTIPLICATION CIRCUIT OUTPUT

DEVICE FOR SUPPLYING ELECTRIC POWER TO FLASHLAMP AND METHOD THEREOF

BACKGROUND OF THE INVENTION

1. Field of the Invention

The present invention relates to a device for, and a method of, supplying electric power to a flashtube or a flashlamp, i.e., a so-called a pulse power supply device. More particularly, the present invention relates to a device for, and a method of, applying an electric power to a flashtube or a flashlamp which optically excites a laser medium by flashes.

2. Description of the Related Art

For a pulse laser device which performs laser oscillation by exciting a laser medium an excitation beam irradiated from a flashlamp, a large amount of electrical power must be applied to the flashlamp momentarily. However, when using a pulse power source device which is at all times capable of supplying momentarily the desired amount of electrical power to the flashlamp, the constitution of the pulse laser device becomes excessively large. For this reason, in such a kind of pulse power source device, a condenser group of a large capacity, which is called a condenser bank, heretofore, has been ordinarily employed. In this case, the energy which is charged in the condenser bank gradually over a long time span is discharged instantaneously to the flashlamp to make it emit a strong flash.

Such a pulse laser device has been used for weld workings for metal materials. To acquire good working results after using the device for such weld workings, stability and reproducibility of a laser output from the pulse laser device are required. Further, for some materials which are used as objects to be worked, it is required to shape the waveforms of the laser output suitably for the purposes of acquiring a sufficient junction strength and preventing cracks. For example, in the case where the objects to be worked are processed with a laser output of a predetermined level, after preheating them by irradiating a weak laser output at the beginning of the workings; and contrarily, in the case where the objects to be worked are processed with the laser output of a predetermined level first, and then they are slowly cooled by decreasing the laser output gradually, it is essential to shape the waveforms of the laser output suitably.

In a circuit configuration where the energy charged in the foregoing condenser bank is discharged to the flashlamp rapidly, an exciting energy to excite the laser medium depends on an applied voltage to the flashlamp, namely, the charging voltage in the condenser bank. Therefore, in order to render the laser output variable, it is necessary to render the charging voltage variable. However, the capacitance of the condenser bank is considerably large which makes it is impossible to change in a short time the charging voltage with a high accuracy.

In a conventional pulse power supply device disclosed in U.S. Pat. No. 4,276,497, the laser output is controlled by inserting means for modulating the applied voltage to the flashlamp, namely a high speed switching circuit, between the condenser bank and the flashlamp.

Specifically, the ON/OFF switching operations of the high speed switching circuit are controlled in response to pulse width modulation signals (hereinafter, referred to as PWM signals) of a desired mark space ratio supplied from the outside. The high speed switching circuit modulates the applied voltage discharged from the condenser bank in response to the PWM signals. The modulated applied voltage is smoothed, and is supplied to the flashlamp serving as a load.

In the conventional pulse power supply device, the applied voltage to the flashlamp can be variable by varying the mark space ratio of the PWM signals supplied from the outside.

However, the conventional pulse power supply device involves a problem that the applied electric power changes in association with the change of the charged voltage of the condenser bank. Specifically, the change in the applied voltage to the flashlamp leads to a change in the laser output, when the charged voltage at the condenser bank decreases at the time of discharging with the passage of time, or when discharging subsequent to the last discharging is begun before the condenser bank with decreased charged voltage due to discharging is fully charged.

Further, there is no certain relation between the mark space ratio of the PWM signals and the laser output. Therefore, it is required to decide, with skill or by trial and error, the way to control the mark space ratio of the PWM signals to obtain the desired waveforms of the laser output.

SUMMARY OF THE INVENTION

The object of the present invention is to provide a method and a pulse power supply device for supplying electric power to a flashtube or a flashlamp which is capable of acquiring a stable laser output.

Another object of the present invention is to provide a method and a pulse power supply device for supplying electric power to a flashtube or a flashlamp to facilitate an acquisition of desired output waveforms of a laser output.

A further object of the present invention is to provide a method and a pulse power supply device for supplying electric power to a flashtube or a flashlamp which can maintain a laser output at a predetermined value, even when a charged voltage at a condenser bank varies.

A still further object of the present invention is to provide a method and a pulse power Supply device for supplying electric power to a flashtube or a flashlamp which can make a laser output respond, at a high speed, to a control signal for controlling a waveform of the laser output.

To achieve the above objects, the pulse power supply device of the present invention supplies power to a flashlamp through a high frequency switching means for supplying a pulse output. The device comprises a first detecting means for detecting a current outputted from said high frequency switching means, a second detecting means for detecting a voltage applied to the flashlamp, and a control means for controlling the high frequency switching means in accordance with a product value of the detected current and the detected voltage.

Further, to achieve the above objects, the method for supplying power to a flashlamp through a high frequency switching means comprises the step of detecting a current outputted from the high frequency switching means, the step of detecting a voltage applied to the flashlamp, and the step of controlling the high frequency switching means in accordance with a product value of the detected current and the detected voltage.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENTS

A first embodiment of the present invention will be described with reference to FIGS. 1 to 4 in detail.

The pulse power supply device of the first embodiment computes the product, i.e. a signal corresponding to an electric power (hereinafter, referred to as an electric power signal) of an output current from a high speed switching circuit and an applied voltage to a flashlamp. In the pulse power supply device, the ON/OFF operations of a switching element consisting of the high speed switching circuit are so controlled that the electric power signal becomes a desired level. Thus, a laser output is controlled.

Figure 1:
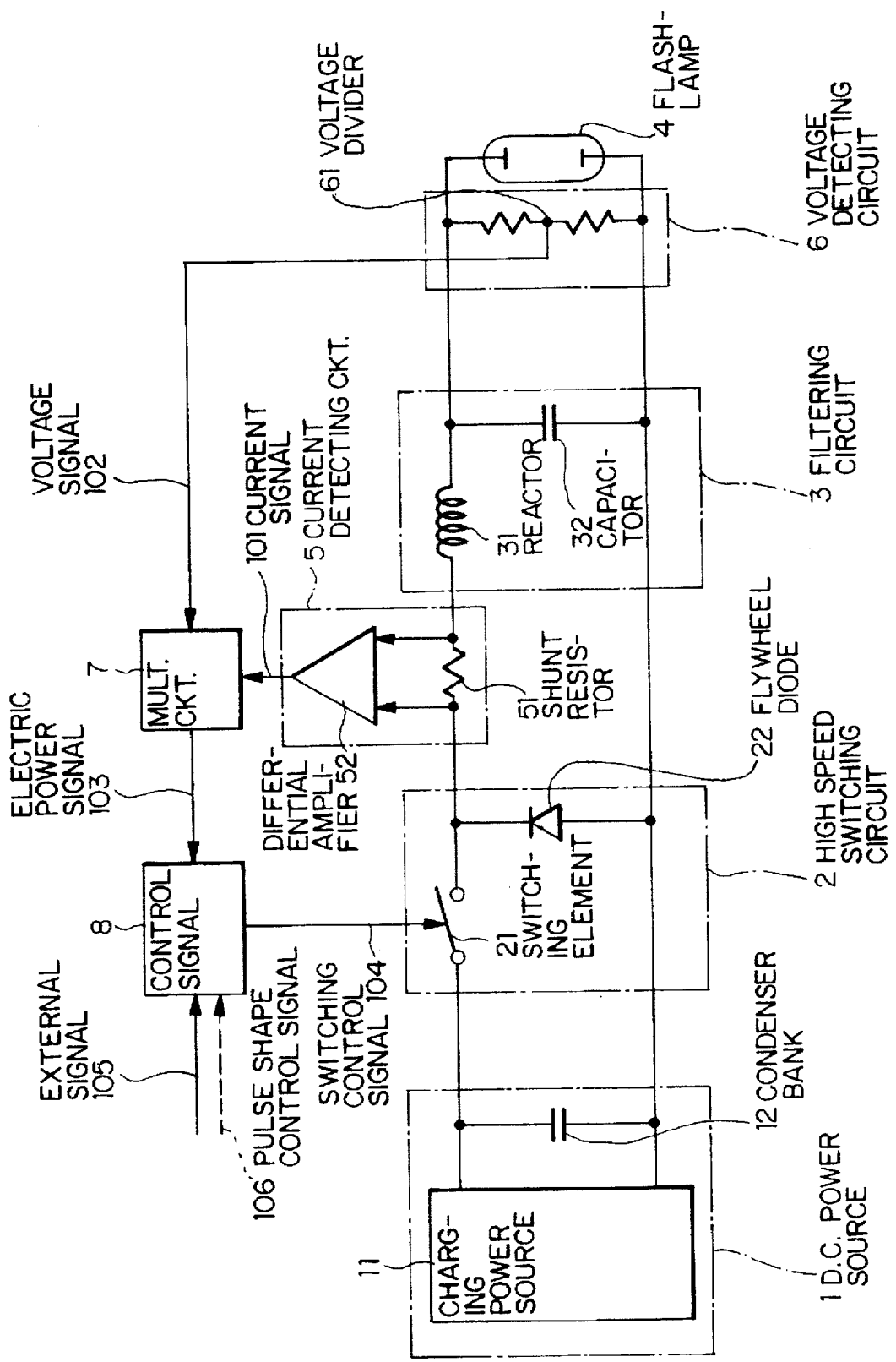
FIG. 1 is a diagram showing a constitution of a pulse power supply device of a first embodiment of the present invention.

Referring to FIG. 1, a direct voltage power source 1 (D.C. power source 1) comprises a charging power source 11 for charging a condenser bank 12 and the condenser bank 12 for discharging the charged energy therein to a flashlamp 4. A high speed switching circuit 2 comprises a switching element 21 to perform high speed switching operations in response to control signals 104 inputted from the outside and a flywheel diode 22 to pass a current therethrough only when the switching element 21 is in OFF state. A semiconductor switching element which consumes little electric power by itself is used as the switching element 21, e.g. an SCR (Silicon Controlled Rectifier, i.e. thyristor), a GTO Thyristor (Gate Turn-Off Thyristor) and an IGBT (Insulated Gate Bipolar Transistor). A filtering circuit 3 comprises a reactor 31 and a capacitor 32, which smooth the output from the high speed switching circuit 2 to apply it to the flashlamp 4.

A current detection circuit 5 comprises a shunt resistor 51 of a very small resistance arranged between the high speed switching circuit 2 and the filtering circuit 3, and a differential amplifier 52 for detecting an output current from the high speed switching circuit 2 based on the potential difference between both terminals of the shunt resistor 51. The current detection circuit 5 detects the output current from the high speed switching circuit 2, and outputs a current signal 101 corresponding to the quantity of the detected current to a multiplication circuit 7. A voltage detection circuit 6 detects an applied voltage to flashlamp 4 by means of a voltage divider 61, and outputs a voltage signal 102 corresponding to the quantity of the detected voltage to the multiplication circuit 7. The multiplication circuit 7 computes the products of the detected current signal 101 by the current detection circuit 5 and the detected voltage signal 102 by the voltage detection circuit 6. The multiplication circuit 7 outputs the value of the product to a control circuit 8 as an electric power signal 103. The control circuit 8 outputs, based on the electric power signal 103 from the multiplication circuit 7, a switching control signal 104 for controlling the switching operations of the switching element 21 of the high speed switching circuit 2. The high speed switching circuit 2 performs the switching operations in accordance with the switching control signal 104 from the control circuit 8.

Figure 2:
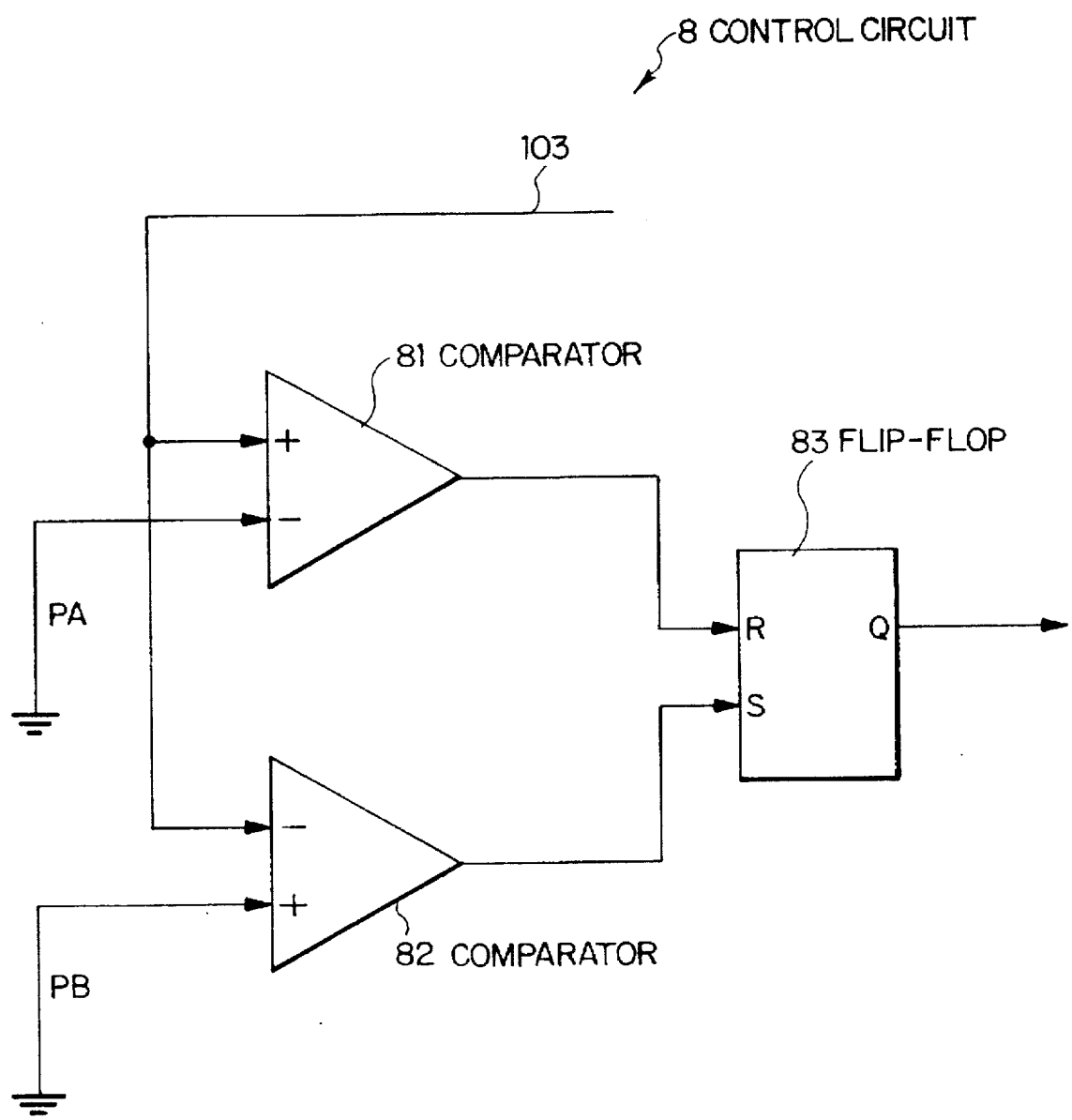
FIG. 2 is a circuit diagram showing a constitution of a control circuit in FIG. 1.

Referring to FIG. 2, a comparator 81 of the control circuit 8 outputs a signal to a flip-flop 83 when the electric power signal 103 from the multiplication circuit 7 becomes more than a predetermined upper limit PA. A comparator of the control circuit 82 outputs a signal to the flip-flop 83 when the electric power signal 103 from the multiplication circuit 7 becomes less than a predetermined lower limit PB. The flip-flop 83 is reset corresponding to the output of the signal from the comparator 81. The flip-flop 83 is set corresponding to the output of the signal from the comparator 82. The switching control signal 104 from the flip-flop 83 is outputted to the switching element 21 of the high speed switching circuit 2. The high speed switching circuit 2 is controlled corresponding to the switching control signal 104 outputted from the flip-flop 83 so as to turn on the switching element 21 at the time of setting of the flip-flop 83 and to turn off the switching element 21 at the time of the resetting of the flip-flop 83.

Next, an operation of the pulse electric power supply device of the first embodiment of the present invention will be described below.

Figure 3A:
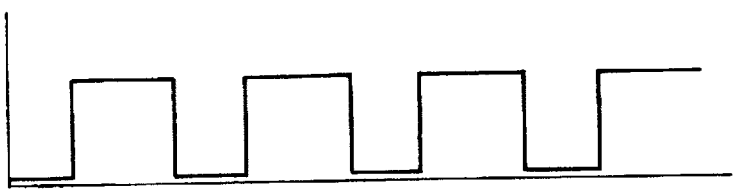
FIG. 3A is a waveform chart showing a switching control signal for switching the switching element in FIG. 1.
Figure 3B:
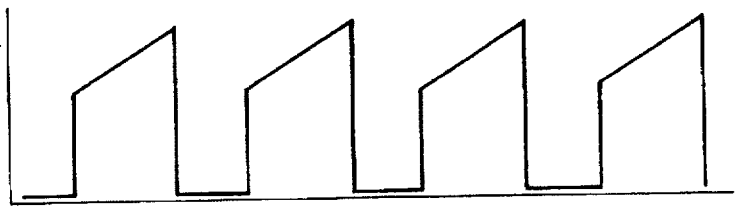
FIG. 3B is a waveform chart showing a current flowing through the switching element in FIG. 1.

When the switching element 21 is in ON state corresponding to the switching control signal 104 outputted from the control circuit 8, a current flows out from the condenser bank 12 which has been in the charged state by the charging power source 11. The current from the condenser bank 12 flows into the flashlamp 4 through the switching element 21 and the reactor 31. The current flowing through the switching element 21 and the reactor 31 increases in accordance with the passage of time, as shown in FIGS. 3B and 3D. Therefore, energy is accumulated in the reactor 31.

On the other hand, when the switching element 21 is in OFF state corresponding to the switching control signal 104, the path of the current is switched so that the current from the condenser bank 12 flows into the flashlamp 4 after passing through the flywheel diode 22 and the reactor 31. The current continuously flows, as shown in FIG. 3D, consuming the energy accumulated in the reactor 31.

Figure 3C:
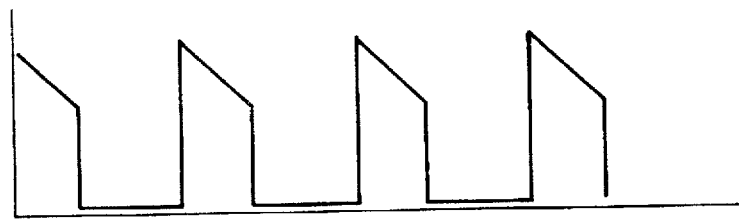
FIG. 3C is a waveform chart showing a current flowing through the fly-wheel diode in FIG. 1.
Figure 3D:
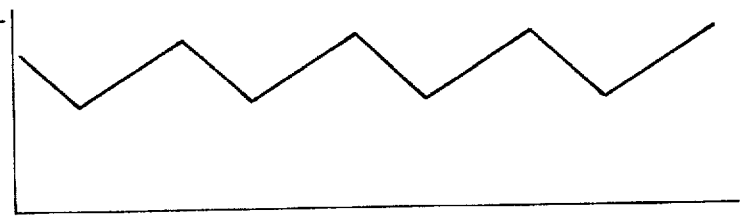
FIG. 3D is a waveform chart showing a current flowing through the reactor in FIG. 1.
Figure 3E:
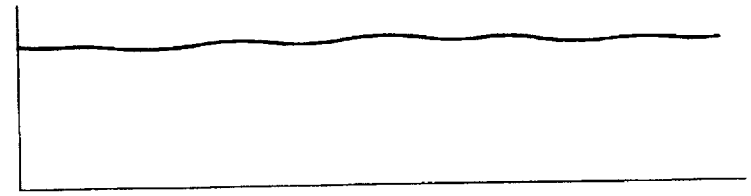
FIG. 3E is a waveform chart showing a current applied to the flashlamp in FIG. 1.

The amount of the current flowing through the reactor 31 is equal to the sum total of the current flowing through the switching element 21 shown in FIG. 3B and the current flowing through the flywheel diode 22 shown in FIG. 3C. The waveform of the current flowing through the reactor 31 is illustrated in FIG. 3D. Further, a current depicting the waveform in FIG. 3E due to the action of the filtering circuit 3, i.e. the current after being smoothed by the filtering circuit 3, flows into the flashlamp 4. Note that a voltage applied to the flashlamp 4 is in proportion to the value of the square root of the applied current.

In the multiplication circuit 7, the product of a current detected by the current detection circuit 5 and a voltage detected by the voltage detection circuit 6 is computed, the current flows from the high speed switching circuit 2 to the circuit 5, and the voltage is applied to the flashlamp 4. The result of the product value is outputted to the control circuit 8 as the electric power signal 103 illustrated by the solid line in FIG. 3F.

Figure 3F:
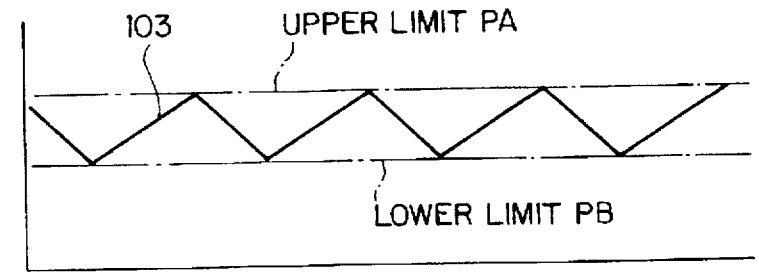
FIG. 3F is a waveform chart showing signals outputted from the multiplication circuit in FIG. 1.

The control circuit 8 previously presets the upper limit PA and the lower limit PB illustrated by the broken line in FIG. 3F. The control circuit 8 outputs the switching control signal 104 shown in FIG. 3A to turn OFF the switching element 21 to the high speed switching circuit 2 when the electric power signal 103 from the multiplication circuit 7 exceeds the upper limit PA. Further, the control circuit 8 outputs the switching control signal 104 shown in FIG. 3A to turn ON the switching element 21 to the high speed switching circuit 2 when the electric power signal 103 is below the lower limit PB. Supplying the switching control signal 104 from the control circuit 8 to the high speed switching circuit 2, the switching element 21 performs the switching operations according to the switching control signal 104 illustrated by the waveforms shown in FIG. 3A. Thus, the feedback loop is made.

Further, the starting and stopping of the power supply to the flashlamp 4 is carried out in accordance with an external signal 105 which is supplied to the control circuit 8 from the outside. Thus, in the pulse power supply device of the first embodiment, a desired electric power corresponding to the average of the preset upper and lower limits PA and PB is supplied to the flashlamp 4. Therefore, laser output pulses exhibiting the desired peak output can be stably obtained.

Moreover, by varying the upper and lower limits PA and PB so as to have desired values during the pulse oscillation, an electric power corresponding to the variation of the upper and lower limits PA and PB is supplied to the flashlamp. Therefore, a laser output pulse exhibiting desired varying waveforms can be obtained only by varying the upper and lower limits PA and PB.

Further, in the pulse power supply device of the first embodiment, a laser output is controlled according to a switching operation speed of the switching element 21. The laser output is controlled so that the product of the output current from the high speed switching circuit 2 and the applied voltage to the flashlamp 4 becomes constant.

Therefore, the output current from the high speed switching circuit 2 can be variably controlled so that the delays of the leading edge and trailing edge of the applied voltage to the flashlamp 4 are compensated. Thus, the pulse power supply device is able to make the laser output correspond to leading and trailing edges of the applied voltage to the flashlamp 4 at high speed.

Figure 4:
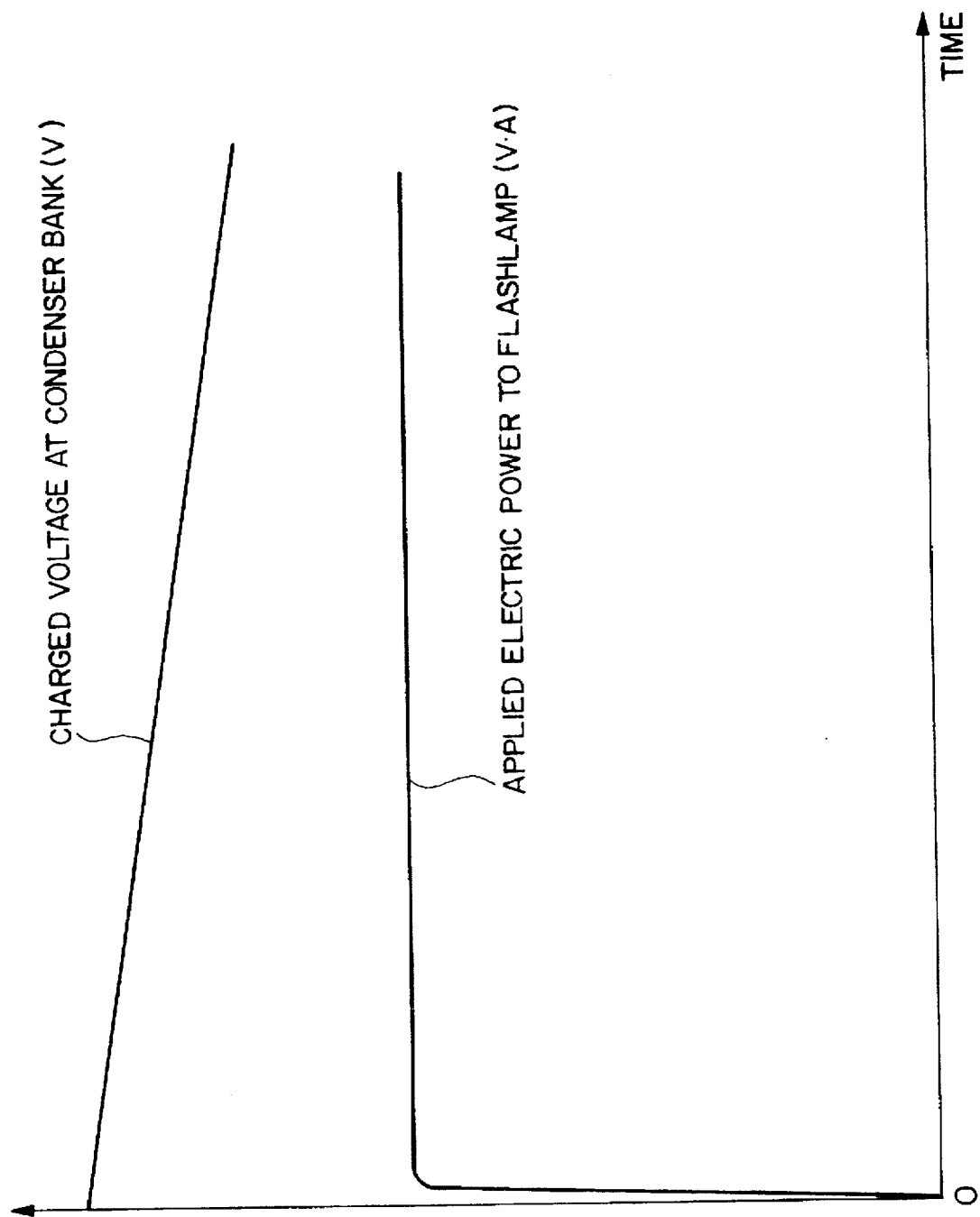
FIG. 4 is a diagram showing a relation between a charged voltage at a condenser bank and an applied electric power to the flashlamp of the first embodiment of the present invention.

FIG. 4 is a diagram showing variations of charged voltage at the condenser bank 12 and the applied voltage to the flashlamp 4 of the first embodiment. As is apparent from FIG. 4, it is found that a constant electric power, which does not depend on the variation of the charged voltage at the condenser bank 12 is supplied to the flashlamp 4. This feature is not produced in the conventional pulse power supply device.

Note that the pulse power supply device of the first embodiment may be provided with a trigger power source to perform an initial ignition for discharging of the flashlamp 4 by applying high voltage pulses to the flashlamp 4, and a simmer current supply circuit to make the flashlamp 4 continue a slight discharging.

Next, a second embodiment of a pulse power supply device of the present invention will be described with reference to FIGS. 1 and 5.

The pulse power supply device of the second embodiment differs from that of the first embodiment in the constitution and operation of the control circuit 8. In the second embodiment, a laser output exhibiting approximately the same waveform as that of a pulse shape control signal inputted to the control signal 8 from the outside can be obtained.

Figure 5:
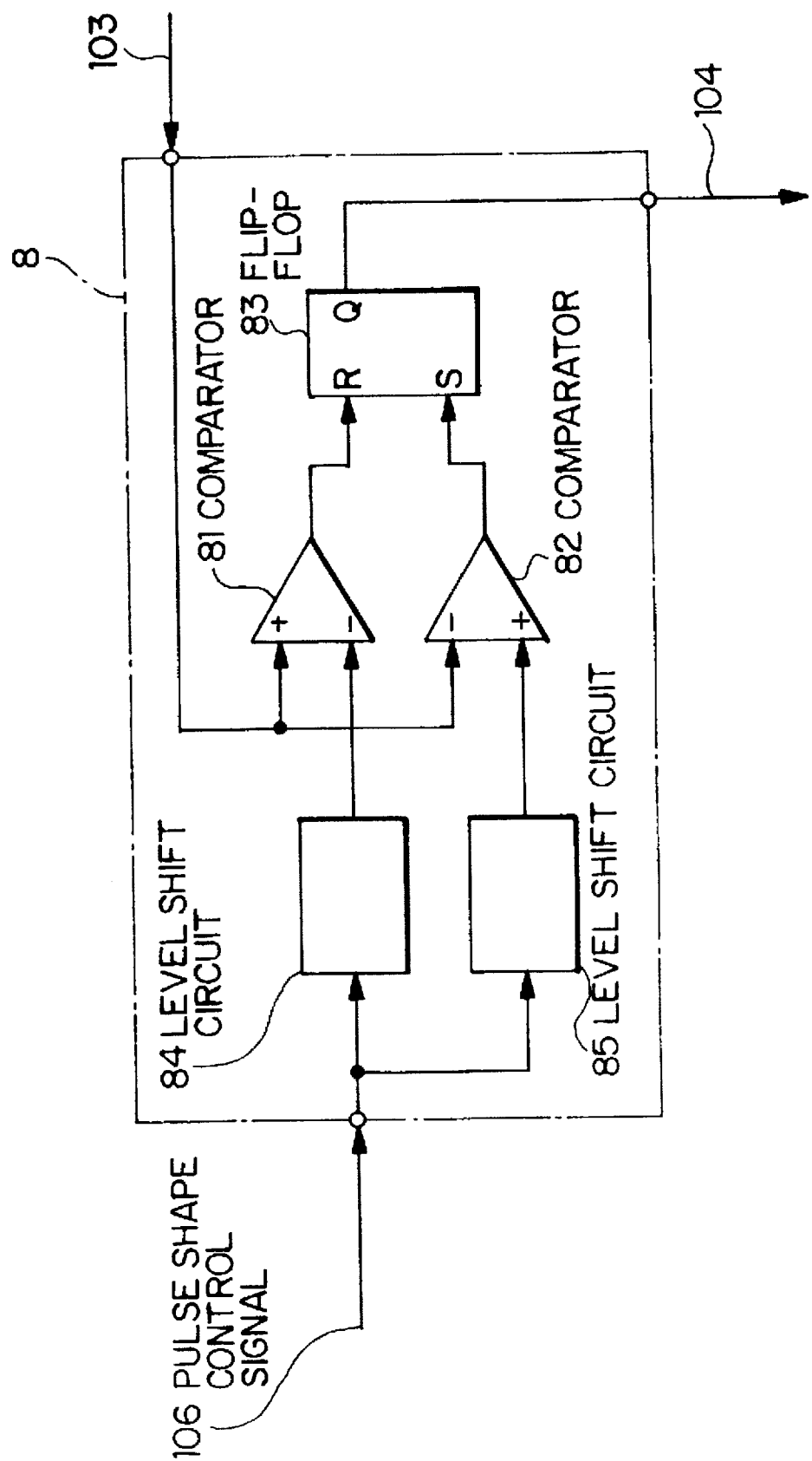
FIG. 5 is a circuit diagram showing a constitution of a control circuit in a pulse power supply device of the second embodiment of the present invention.

Referring to FIG. 5, the amplitude level of a pulse shape control signal 106 exhibiting approximately the same waveform as a desired laser output waveform is slightly increased or slightly decreased by level shift circuits 84 and 85. Specifically, the level shift circuit 84 increases slightly the amplitude level of the pulse shape control signal 106 and outputs a signal of the increased amplitude level to the comparator 81 as an upper limit. The level shift circuit 85 slightly decreases slightly the amplitude level of the pulse shape control signal 106 and outputs a signal of the decreased amplitude level to the comparator 82 as a lower limit. The comparator 81 compares the electric power signal 103 from the multiplication circuit 7 with the upper limit from the level shift circuit 84. When the electric power signal 103 becomes above the upper limit, the comparator 81 outputs a signal to the flip-flop 83. The comparator 82 compares the electric power signal 103 from the multiplication circuit 7 with the lower limit from the level shift circuit 85. When the electric power signal 103 becomes below the lower limit, the comparator 82 outputs a signal to the flip-flop 83. The flip-flop 83 is reset by the signal from the comparator 81. The flip-flop 83 is set by the signal from the comparator 82. A switching control signal 104 outputted from the flip-flop 83 is supplied to the switching element 21 of the high speed switching circuit 2. In the case where the flip-flop 83 is set, the switching element 21 is rendered ON state. In the case where the flip-flop 83 is reset, the switching element 21 is rendered OFF state.

Figure 6A:
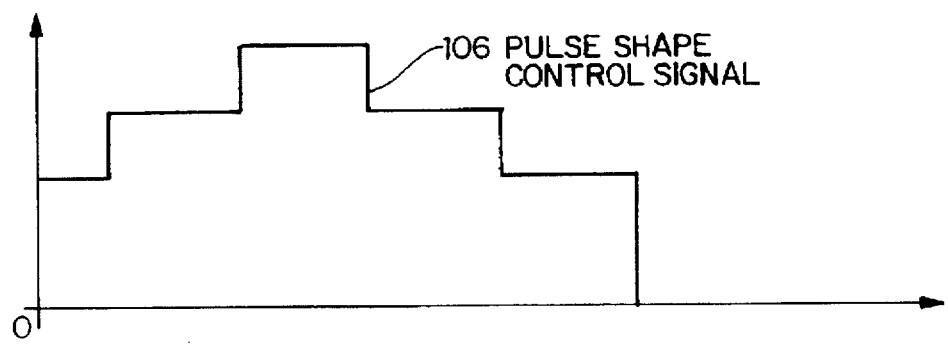
FIG. 6A is a waveform chart showing an example of a pulse shape control signal inputted to the control circuit in FIG. 1 or FIG. 5.
Figure 6B:
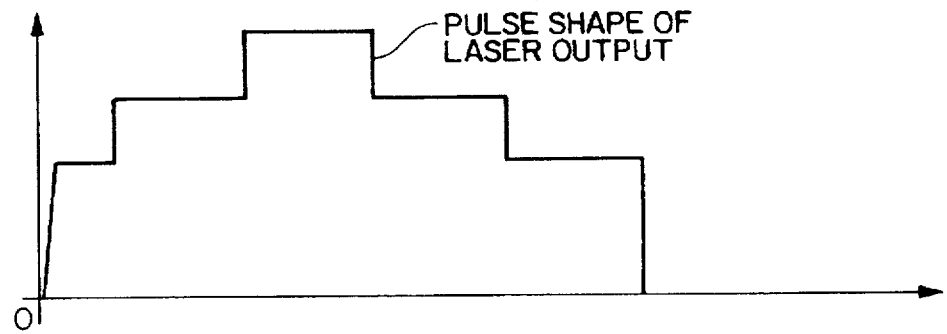
FIG. 6B is a waveform chart showing a pulse shape of a laser output in case where the pulse shape control signal shown in FIG. 6A is inputted to the control circuit.
Figure 7A:
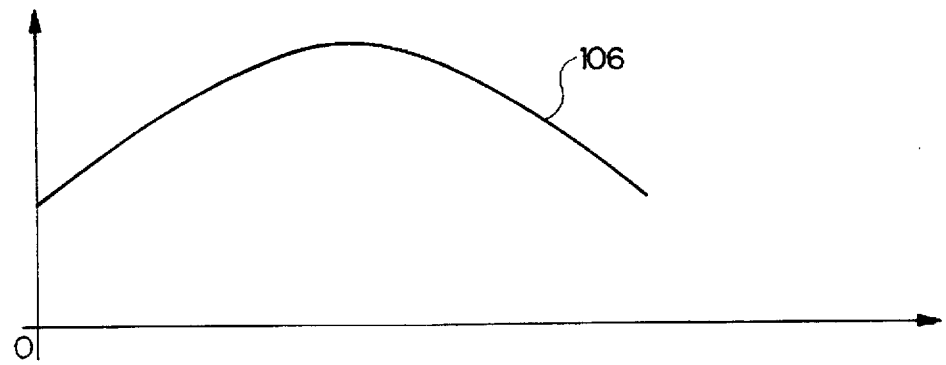
FIG. 7A is a waveform chart showing another example of the pulse shape control signal inputted to the control circuit shown in FIG. 1 or FIG. 5.
Figure 7B:
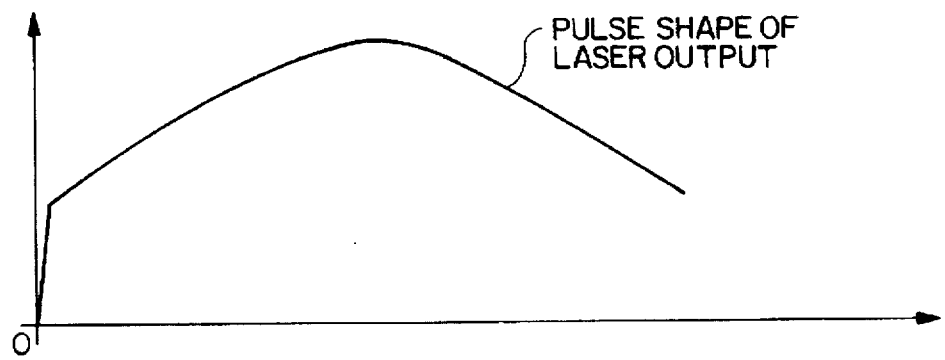
FIG. 7B is a waveform chart showing a pulse shape of a laser output in case where the pulse shape control signal shown in FIG. 7A is inputted to the control circuit.

As described above, the ON/OFF switching operations of the switching element 21 is controlled in accordance with the switching control signal 104. Hence, the waveform of the laser output conforms approximately to that of the pulse shape control signal 106 inputted to the control circuit 8. When the pulse shape control signal 106 exhibiting, for example, a step-shape shown in FIG. 6A is inputted to the control circuit 8, the laser output exhibits the waveform as illustrated in FIG. 6B. Except that outputting of the laser output in response to the pulse shape control signal 106 is delayed somewhat, it is proved that the waveform of the laser output conforms approximately with that of the pulse shape control signal 106. Further, even when the pulse shape control signal 106 having a slope shown in FIG. 7A is inputted to the control circuit 8, the laser output waveform which has the approximately same waveform as that of the pulse shape control signal 106 can be obtained, as shown in FIG. 7B. As described above, by inputting the pulse shape control signal 106, which has the same waveform as that of the laser output to be obtained, to the control circuit 8, the desired waveform of the laser output can be obtained.

A third embodiment of a pulse power supply device of the present invention will be described with reference to FIGS. 1, 8 and 9, below.

The pulse power supply device of the third embodiment of the present invention also differs from the pulse power supply device of the foregoing first embodiment shown in FIG. 1 in a constitution and operation of the control circuit 8. Also in the third embodiment, likewise in the foregoing second embodiment, the waveform of a laser output exhibiting the approximately same shape as that of the pulse shape control signal 106, which is inputted to the control circuit 8 from the outside, can be obtained.

Figure 8:
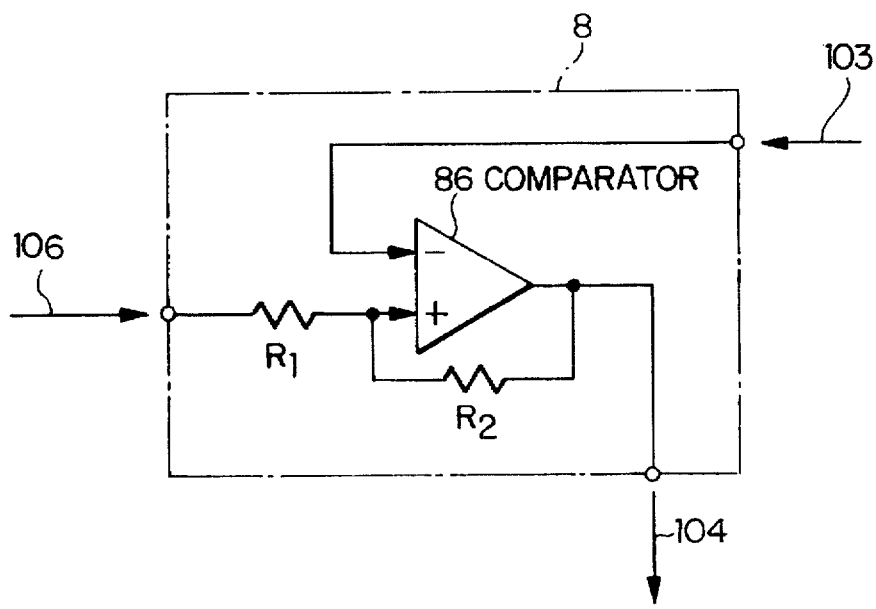
FIG. 8 is a block diagram showing a constitution of a control circuit in a pulse power supply device of the third embodiment of the present invention.
Figure 9A:
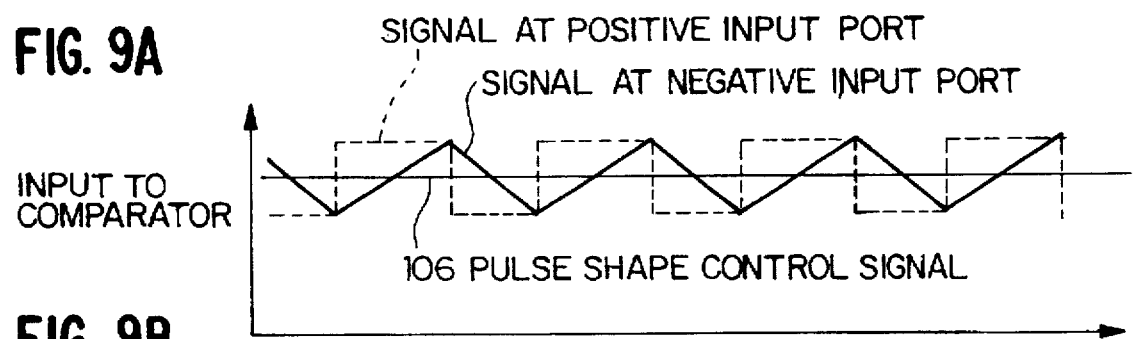
FIG. 9A is a waveform chart showing a signal inputted to the comparator in FIG. 8.
Figure 9B:
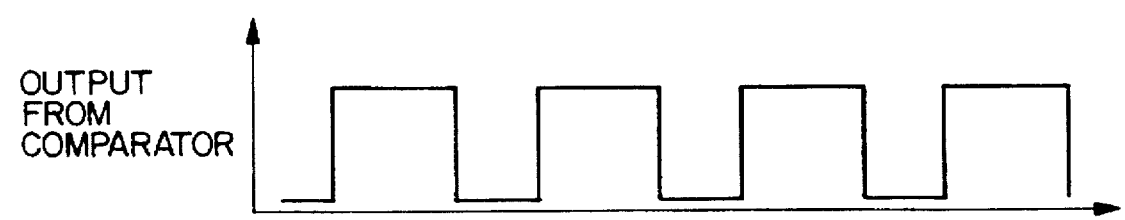
FIG. 9B is a waveform chart showing a control signal outputted from the comparator in FIG. 8.

Referring to FIG. 8, in the control circuit 8 of the third embodiment, an output from the comparator 86 is fed-back to the non-inverted input terminal (positive input terminal) thereof. Note that a feedback amount of the comparator 86 is decided by a voltage amplification factor thereof, and the voltage amplification factor is decided by a ratio of the resistance of the resistor R2 to that of the resistor R1. Specifically, the control circuit 8 acts as a comparing means having a hysteresis according to the feed-back amount of the comparator 86. Levels corresponding to an upper and lower limits of the pulse shape control signal 106 are set according to a hysteresis amount. The upper and lower limits of the pulse shape control signal 106 are compared with the electric power signal 103 from the multiplication circuit 7, so that the similar advantages to those of the foregoing second embodiment can be obtained.

In other words, in the control circuit 8 shown in FIG. 8, the electric power signal 103 from the multiplication circuit 7 is inputted to the inverted input terminal (negative input terminal) of the comparator 86. The sum of the pulse shape control signal 106 from the outside and the positive feedback amount, which is decided by the ratio of the resistance of the resistor R1 to that of the resistor R2 as described above, are inputted to the non-inverted input terminal of the comparator 86. Then, the switching control signal 104 is outputted from the comparator 86 to the high speed switching circuit 2 at timings shown in FIGS. 9A and 9B, thereby controlling the ON/OFF operations of the switching element 21.

A fourth embodiment of a pulse power supply device of the present invention will be described with reference to FIG. 10, below.

The pulse power supply device of the fourth embodiment of the present invention differs from that of the first embodiment in a constitution of the current detection circuit 5 for detecting the output current from the high speed switching circuit 2.

In the pulse power supply device of the first embodiment of the present invention shown in FIG. 1, the potential difference between both terminals of the shunt resistor 51, arranged between the high speed switching circuit 2 and the filtering circuit 3, is detected, in order to compute the output current from the high speed switching circuit 2. However, such a configuration could experience a large electric power loss and could be influenced by noises. Further, for a system for detecting a current flowing through a toroidal-shaped coil, called a current converter, the accurate detection of the current is difficult due to a magnetic hysteresis of a magnetic core material incorporated in the coil.

Figure 10:
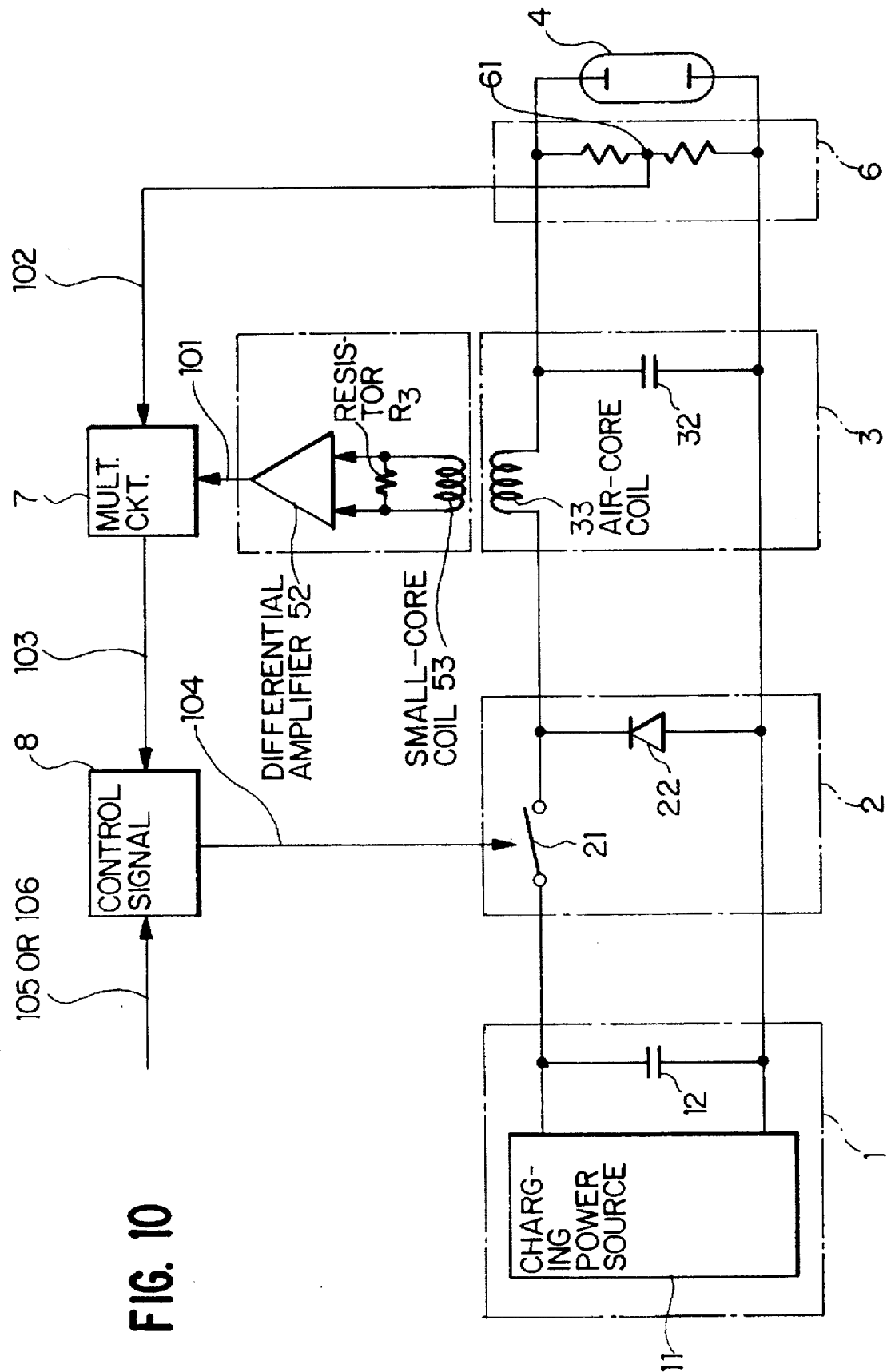
FIG. 10 is a diagram showing a constitution of a pulse power supply device of the fourth embodiment of the present invention.

Considering the above circumstances, in the pulse power supply device of the fourth embodiment shown in FIG. 10, an air-core coil 33 is employed as the reactor of the filtering circuit 3. A small-core coil 53 is disposed inside the air-core coil 33. A current signal induced in the small-core coil 53 is detected. The current induced in the small-core coil 53 is converted to a voltage signal by a small load resistor R3. The voltage signal is amplified by the differential amplifier 52, and the amplified voltage signal is outputted from the differential amplifier 52 to the multiplication circuit 7 as the detected current detection signal 101.

When employing the current detection circuit 5 of such the constitution, little electric power loss is caused and an accurate current detection can be done without being influenced by a magnetic saturation and hysteresis.

Next, a fifth embodiment of a pulse power supply device of the present invention will be described with reference to FIG. 11, below.

The pulse power supply device of the fifth embodiment of the present invention differs from that of the foregoing first embodiment in a constitution of the current detection circuit 5 for detecting the output current from the high speed switching circuit 2.

Figure 11:
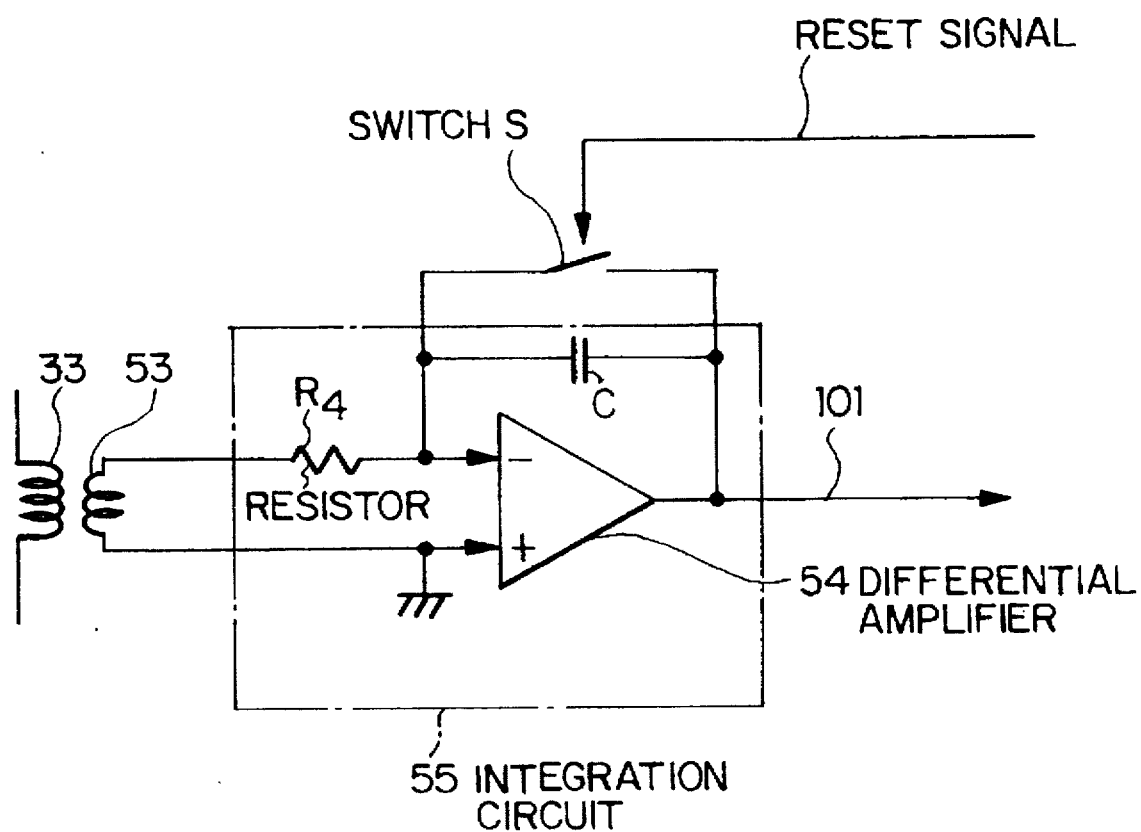
FIG. 11 is a circuit diagram showing a constitution of a current detection circuit in a pulse power supply device of the fifth embodiment of the present invention.

Referring to FIG. 11, an air-core coil 33 is employed as the reactor of the filtering circuit 3, and a small-core coil 53 is disposed inside the air-core coil 33. The voltage signal induced in the small-core coil 53 is integrated by an integration circuit 55 consisted of a high resistance resistor R4, a capacitance C, and a differential amplifier 54, thereby detecting a current flowing through the air-core coil 33. In other words, little load current flows thorough the small-core coil 53 so that a signal (a signal corresponding to voltage) corresponding to a differentiation value of the current flowing through the air-core coil 33 is induced in the small coil 53. At the time of the pulse operations, a switch S is opened in response to a reset signal 107 so that the integration operation of the signal corresponding to voltage starts. Thus, the current flowing through the air-core coil 33 can be reproduced with high fidelity, thereby detecting the current.

Also the current detection circuit of the fifth embodiment of the present invention scarcely losses electric power and is not affected by a magnetic saturation and hystresis due to the magnetic core material. Further, the current detection circuit of the fifth embodiment is not significantly affected by noises from the outside. Hence, the current detection circuit of the fifth embodiment can detect the current accurately.

In the descriptions concerning the current detection circuit of the fourth and fifth embodiments, it was described that the small-core coil 53 for the reactor current detection is disposed inside the reactor, i.e., the air-core coil 33. The small-core coil 53 may be disposed so as to be adjacent to the outside of the air-core coil 33. Further, the dispoition of the small coil 53 is not limited so far as the small-core coil 53 is disposed within an area where the coil 53 is effectively in a magnetic field generated by the air-core coil 33.

Although the preferred embodiments of the present invention has been described in detail, it should be understood that various changes, substitutions and alternations can be made therein without departing from spirit and scope of the inventions as defined by the appended claims.

What is claimed is:

1. A pulse power supply device which supplies power to a flashlamp through a series of a high speed switching means and a filtering means for supplying a pulse output, comprising:

first detecting means for detecting a current output from said high speed switching means before said filtering means, said current having a triangular waveform produced according to a conductive state of said high speed switching means;

second detecting means for detecting a voltage applied to said flashlamp;

multiplication means for multiplying said current and said voltage to produce a power signal which increases when said high speed switching means is conductive and decreases when said high speed switching means is non-conductive; and control means for controlling said high speed switching means such that said high speed switching means is turned on until said power signal reaches a first level and said high speed switching means is turned off until said power signal reaches a second level, said first and second levels being designated over and under a predetermined level.

2. A pulse power device as claimed in claim 1, wherein said control means comprises a comparator having a positive input terminal, a negative input terminal, and an output terminal, wherein a control signal is input to said positive input terminal, said power signal is input to said negative input terminal, and an output from said output terminal is fed back to said positive input terminal.

3. The pulse power supply device as claimed in claim 1, wherein said high speed switching means comprises:

a switching element selected from a group consisting of a thyristor, a gate turn-off thyristor and an insulated gate bipolar transistor; and a diode passing a current only when said switching element is non-conductive.

4. The pulse power supply device as claimed in claim 1, wherein said control means comprises:

a first level shift means for elevating said predetermined level to produce said first level;

a second level shift means for lowering said predetermined level to produce said second level;

a first comparator for comparing a level of said power signal with said first level and generating a first control signal when said level of said power signal becomes larger than said first level, said first control signal rendering said high speed switching means non-conductive; and a second comparator for comparing said level of said power signal with said second level and generating a second control signal when said level of said power signal becomes smaller than said second level signal, said second control signal rendering said high speed switching means conductive.

5. A method for supplying power to a flashlamp through a series of a high speed switching means and a filtering means for outputting a pulse output, comprising the steps of:

detecting a current output from said high speed switching means before said filtering means, said current having a triangular waveform produced according to a conductive state of said high speed switching means;

detecting a voltage applied to said flashlamp;

multiplying said current and voltage to produce a power signal which increases when said high speed switching means is conductive and decreases when said high speed switching means is not conductive; and controlling said high speed switching means such that said high speed switching means is turned on until said power signal reaches a first level and said high speed switching means is turned off until said power signal reaches a second level, said first and second levels being designated over and under a predetermined level.

6. A pulse power supply device which supplies power to a flashlamp through a series of high speed switching means and a filtering means for supplying a pulse output, said flashlamp optically exciting a laser medium to output a laser beam, comprising:

first detecting means for detecting a current output from said high speed switching means before said filtering means, said current having a triangular waveform produced according to a conductive state of said high speed switching means;

second detecting means for detecting a voltage applied to said flashlamp;

multiplication means for multiplying said current and said voltage to produce a power signal which increases when said high speed switching means is conductive and decreases when said high speed switching means is non-conductive; and control means for controlling said high speed switching means such that said high speed switching means is turned on until said power signal reaches a first level and said high speed switching means is turned off until said power signal reaches a second level, said first and second levels being designated over and under an amplitude level of a control signal having a waveform equal to a waveform of a predetermined laser output.

7. The pulse power supply device as claimed in claim 6, wherein said power supplied through a high speed switching means to said flashlamp is discharged from a condenser bank.

8. The pulse power supply device as claimed in claim 6, wherein said control means comprises:

a first level shift means for elevating an amplitude level of said control signal to produce said first level;

a second level shift means for lowering the amplitude level of said control signal to produce said second level;

a first comparator for comparing said first level with a level of said power signal and generating a first control signal when said level of said power signal becomes larger than said first level, said first control signal rendering said high speed switching means non-conductive; and;

a second comparator for comparing said second level with said level of said power signal and generating a second control signal when said level of said power signal becomes smaller than said second level, said second control signal rendering said high speed switching means conductive.

9. The pulse power supply device as claimed in claim 6, wherein said control means is a comparator for receiving said power signal at its negative input terminal and for receiving a sum of said control signal and a positive feedback signal in accordance with a ratio of two resistors connected in series at its positive terminal.

10. The pulse power supply device as claimed in claim 1, wherein said first detecting means comprises:
- a resistor connected in series between said high speed switching means and said flashlamp; and
- means for detecting said current output from said high speed switching means in accordance with a potential difference between both terminals of said resistor.

11. The pulse power supply device according to claim 1, said device further comprising:
- filtering means for smoothing an output from said high speed switching means, including a reactor connected in series to said high speed means and a capacitor having one terminal connected to a connection node of said reactor and said flashlamp, and the other terminal connected to said high speed switching means,
- wherein said first detecting means detects a current flowing through said reactor as said current output from said high speed switching means.

12. The pulse power supply device as claimed in claim 1, said device further comprising:
- filtering means for smoothing an output from said high speed switching means, including an air-core coil connected in series to said high speed switching means and a capacitor having one terminal connected to a connection node of said air-core coil and said flashlamp and the other terminal connected to said high speed switching means,
- wherein said first detecting means comprises a small-core coil disposed in a region where a magnetic field generated by said air-core coil is effective and computing means for computing a current flowing through said air-core coil based on a current induced in said small-core coil.

13. The pulse power supply device as claimed in claim 12, wherein said small-core coil is disposed inside said air-core coil.

14. The pulse power supply device as claimed in claim 12, wherein said computing means comprises a resistor for converting the current induced in said small-core coil to a voltage signal and a differential amplifier circuit for amplifying a potential difference between both terminals of said resistor.

15. The pulse power supply device as claimed in claim 12, wherein said computing means computes an integration value based on a voltage signal induced in said small-core coil by said air-core coil.

16. The pulse power supply device as claimed in claim 15, wherein said computing means further comprises an integration circuit, said integration circuit comprising a high resistance resistor, a capacitor, and a differential amplifier.

17. The pulse power supply device as claimed in claim 6, said device further comprising:
- filtering means for smoothing an output from said high speed switching means, including an air-core coil connected in series to said high speed switching means and a capacitor having one terminal connected to a connection node of said air-core coil and said flashlamp, and the other terminal connected to said high speed switching means,
- wherein said first detecting means comprises a small-core coil disposed in a region wherein a magnetic field generated by said air-core coil is effective and computing means for computing a current flowing through said air-core coil based on a current induced in said small-core coil.

18. The pulse power supply device as claimed in claim 6, said device further comprising:
- filtering means for smoothing an output from said high speed switching means, including a reactor connected in series to said high speed switching means and a capacitor having one terminal connected to a connection node of said reactor and said flashlamp and the other terminal connected to said high speed switching means,
- wherein said first detecting means detects a current flowing through said reactor.

19. The pulse power supply deice as claimed in claim 18, wherein said computing means computes an integration value based on a voltage signal induced in said small-core coil by said air-core coil.

20. The pulse power supply device as claimed in claim 19, wherein said computing means further comprises an integration circuit, said integration circuit comprising a high resistance resistor, a capacitor, and a differential amplifier.

21. The pulse power supply device as claimed in claim 18, wherein said computing means comprises a resistor for converting the current induced in said small-core coil to a voltage signal and a differential amplified circuit for amplifying a potential difference between both terminals of said resistor.

22. The method as claimed in claim 5, wherein said controlling step comprises the steps of:
- elevating said predetermined level to produce said first level;
- comparing a level of said power signal with said first level and generating a first control signal when said level of said power signal becomes larger than said first level, said first control signal rendering said high speed switching means nonconductive;
- lowering said predetermined level to produce said second level; and
- comparing said level of said power signal with said second level and generating a second control signal when said level of said power signal becomes smaller than said second level signal, said second control signal rendering said high speed switching means conducive.

23. The pulse power supply device as claimed in claim 18, wherein said small-core coil is disposed inside said air-core coil.

* * * * *